(12) United States Patent
Sohn et al.

(10) Patent No.: US 10,606,118 B2
(45) Date of Patent: Mar. 31, 2020

(54) DISPLAY APPARATUS AND METHOD OF CONTROLLING THE SAME

(71) Applicant: SAMSUNG ELECTRONICS CO., LTD., Suwon-si (KR)

(72) Inventors: Sang Hyun Sohn, Suwon-si (KR); Sang Yeon Shin, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 16 days.

(21) Appl. No.: 15/710,944

(22) Filed: Sep. 21, 2017

(65) Prior Publication Data
US 2018/0157102 A1    Jun. 7, 2018

(30) Foreign Application Priority Data

Dec. 7, 2016 (KR) ........................ 10-2016-0165694

(51) Int. Cl.
*G02F 1/1335* (2006.01)
*F21V 8/00* (2006.01)
*G02B 6/00* (2006.01)
*G02F 1/1333* (2006.01)

(52) U.S. Cl.
CPC ......... *G02F 1/133514* (2013.01); *G02B 6/00* (2013.01); *G02F 1/133524* (2013.01); *G02F 1/133528* (2013.01); *G02F 1/13338* (2013.01); *G02F 1/133615* (2013.01); *G02F 2001/133538* (2013.01); *G02F 2001/133548* (2013.01); *G02F 2201/52* (2013.01)

(58) Field of Classification Search
None
See application file for complete search history.

(56) References Cited

U.S. PATENT DOCUMENTS 8,164,711 B2 * 4/2012 Shiraishi .......... G02F 1/133615
349/65
8,514,352 B2 * 8/2013 Montgomery .... G02F 1/133615
349/108
(Continued)

FOREIGN PATENT DOCUMENTS

JP    2004325907 A    11/2004
KR    10-0952137 B1    4/2010
(Continued)

OTHER PUBLICATIONS

International Search Report (PCT/ISA/210), issued by International Searching Authority in corresponding International Application No. PCT/KR2017/011594, dated Mar. 5, 2018.

*Primary Examiner* — Edward J Glick
*Assistant Examiner* — Anthony G Quash
(74) *Attorney, Agent, or Firm* — Sughrue Mion, PLLC

(57) ABSTRACT

A display apparatus and a method of controlling the same are disclosed. The display apparatus includes: a light source configured to emit light having a wavelength less than or equal to a predetermined level; a waveguide plate having a slope pattern that allows the light emitted from the light source to be output to a left side or a right side about a vertical direction of an optical axis of the light source; and a display panel comprising a plurality of pixels, each of the plurality of pixels comprising a white sub pixel configured to transmit the light output from the waveguide plate.

17 Claims, 14 Drawing Sheets

(56) References Cited

U.S. PATENT DOCUMENTS

| | | | |
|---|---|---|---|
| 2009/0122229 A1* | 5/2009 | Kim | G02B 6/0038 349/65 |
| 2009/0284688 A1 | 11/2009 | Shiraishi et al. | |
| 2009/0290096 A1 | 11/2009 | Yoon et al. | |
| 2011/0013123 A1 | 1/2011 | Park et al. | |
| 2014/0292839 A1* | 10/2014 | Huang | G02F 1/133533 345/694 |

FOREIGN PATENT DOCUMENTS

| | | |
|---|---|---|
| KR | 10-2011-0061899 A | 6/2011 |
| WO | 2016094139 A1 | 6/2016 |

\* cited by examiner

DISPLAY APPARATUS AND METHOD OF CONTROLLING THE SAME

CROSS-REFERENCE TO RELATED APPLICATION

This application claims priority from Korean Patent Application No. 10-2016-0165694, filed on Dec. 7, 2016 in the Korean Intellectual Property Office, the disclosure of which is incorporated herein by reference in its entirety.

BACKGROUND

1. Field

Apparatuses and methods consistent with exemplary embodiments relate to a display apparatus to provide a variety of images to a user in a visual manner and a method of controlling the same.

2. Description of the Related Art

A display apparatus represents an apparatus capable of visually displaying various images by having a device for displaying an image. Image data displayed through a display panel of the display apparatus includes a variety of image data, e.g., image data transmitted through broadcast signals and image data transmitted from a web server. Recently, a study has been carried out to minimize the image quality distortion and the residual image on the display panel.

SUMMARY

One or more exemplary embodiments provide a display apparatus having an improved transparency.

According to an aspect of an exemplary embodiment, there is provided a display apparatus including: a light source configured to emit light having a wavelength less than or equal to a predetermined level; a waveguide plate having a slope pattern that allows the light emitted from the light source to be output to a left side or a right side about a vertical direction of an optical axis of the light source; and a display panel comprising a plurality of pixels, each of the plurality of pixels comprising a white sub pixel configured to transmit the light output from the waveguide plate.

The display apparatus may further include a polarizing plate having a hole pattern in a region corresponding to the white sub pixel contained in the plurality of pixels and a polarizing pattern in a region corresponding to at least one of other sub pixels contained in the plurality of pixels.

The light emitted from the light source may be a blue light.

The display panel may include at least one color filter into which one of phosphor and scatter is injected.

The display panel may include a red color filter into which a first phosphor is injected to convert the blue light emitted from the light source into a red light and scatter the red light, a green color filter into which a second phosphor is injected to convert the blue light emitted from the light source into a green light and scatter the green light and a blue color filter into which scatter is injected to scatter the blue light emitted from the light source.

The white sub pixel may be provided in the display panel transmits the light output through the waveguide plate.

Each of the plurality of pixels may include the white sub pixel, the red sub pixel, the green sub pixel and the blue sub pixel, the display apparatus may further include a controller configured to control a drive voltage applied to at least one of the red sub pixel, the green sub pixel and the blue sub pixel based on a ratio between an area of the white sub pixel and a sum of area of the red sub pixel, the green sub pixel and the blue sub pixel.

Each of the plurality of pixels may include the white sub pixel, the red sub pixel, the green sub pixel and the blue sub pixel, and the ratio between the area of the white sub pixel and the sum of area of the red sub pixel, the green sub pixel and the blue sub pixel is predetermined.

A ratio between a total area of a region in which the hole pattern may be provided in the waveguide plate, and a total area of a region in which the white sub pixel may be provided in the display panel is predetermined.

The display apparatus may further include a controller configured to perform a transparent mode by controlling driving of at least one of the light source and the display panel.

According to an aspect of another exemplary embodiment, there is provided a display apparatus including: a light source configured to emit light having a wavelength less than or equal to a predetermined level; a display panel comprising a plurality of pixels, each of the plurality of pixels comprising a white sub pixel configured to transmit the light output from a waveguide plate; and a controller configured to control at least one of displaying an image and executing a transparent mode by controlling a drive power applied to at least one of the light source and the display panel.

The display apparatus may further include a polarizing plate having a hole pattern in a region corresponding to the white sub pixel contained in the plurality of pixels and a polarizing pattern in a region corresponding to at least one of other sub pixels contained in the plurality of pixels.

The display panel may include at least one color filter into which one of phosphor and scatter is injected.

The light emitted from the light source may emit a blue light, the display panel may include a red color filter into which a first phosphor is injected to convert the blue light emitted from the light source into a red light and scatter the red light, a green color filter into which a second phosphor is injected to convert blue light emitted from the light source into a green light and scatter the green light and a blue color filter into which scatter is injected to scatter the blue light emitted from the light source.

Each of the plurality of pixels may include the white sub pixel, the red sub pixel, the green sub pixel and the blue sub pixel, and the display apparatus may further include a controller configured to control a drive voltage applied to at least one of the red sub pixel, the green sub pixel and the blue sub pixel based on a ratio between an area of the white sub pixel and a sum of area of the red sub pixel, the green sub pixel and the blue sub pixel.

Each of the plurality of pixels may include the white sub pixel, the red sub pixel, the green sub pixel and the blue sub pixel, and a ratio between an area of the white sub pixel and a sum of area of the red sub pixel, the green sub pixel and the blue sub pixel is predetermined.

A ratio between a total area of a region in which the hole pattern may be provided in the waveguide plate, and a total area of a region in which the white sub pixel is provided in the display panel may be predetermined.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
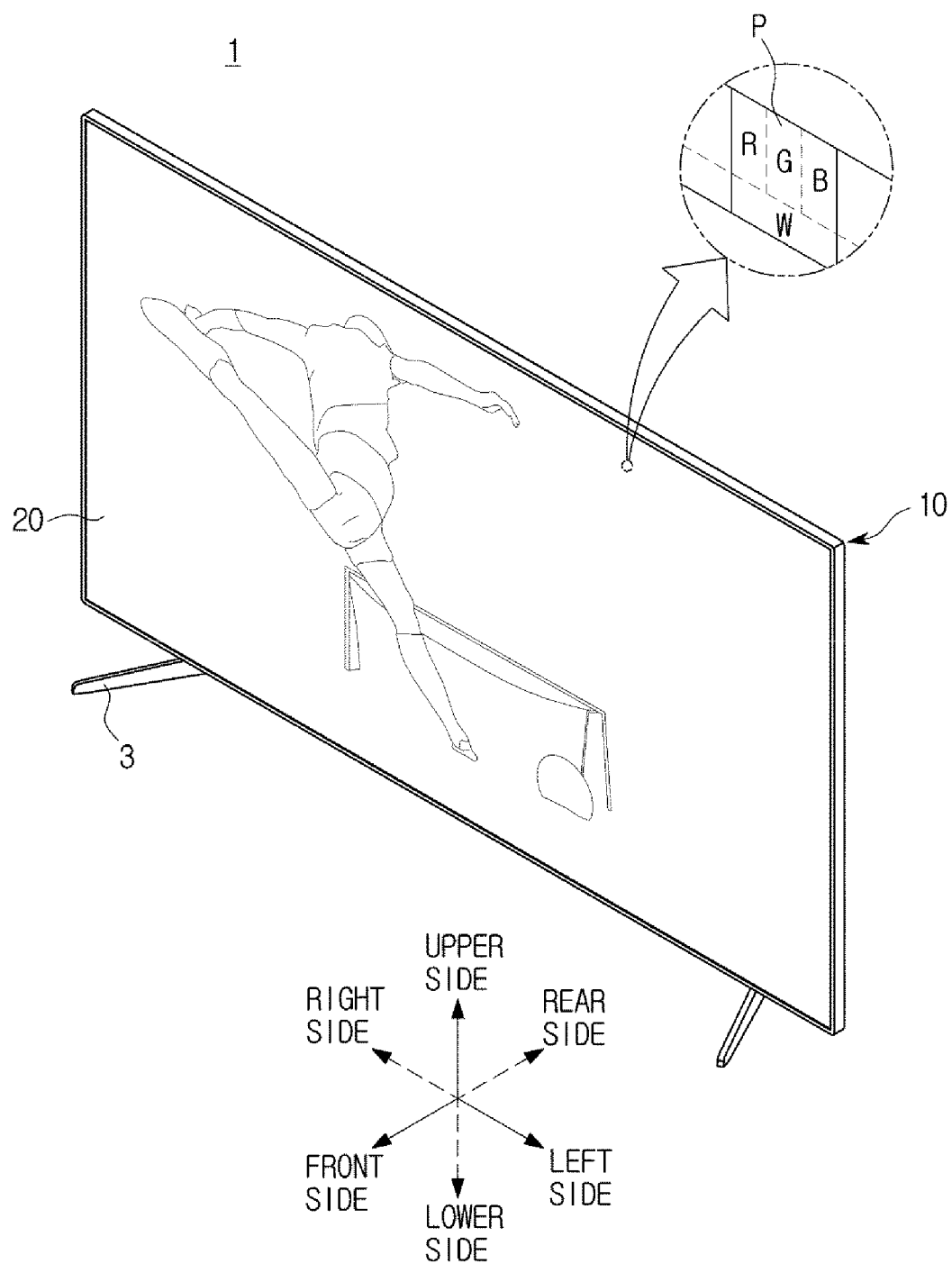
FIG. 1 is a view illustrating an appearance of a display apparatus in accordance with an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list.

Figure 2:
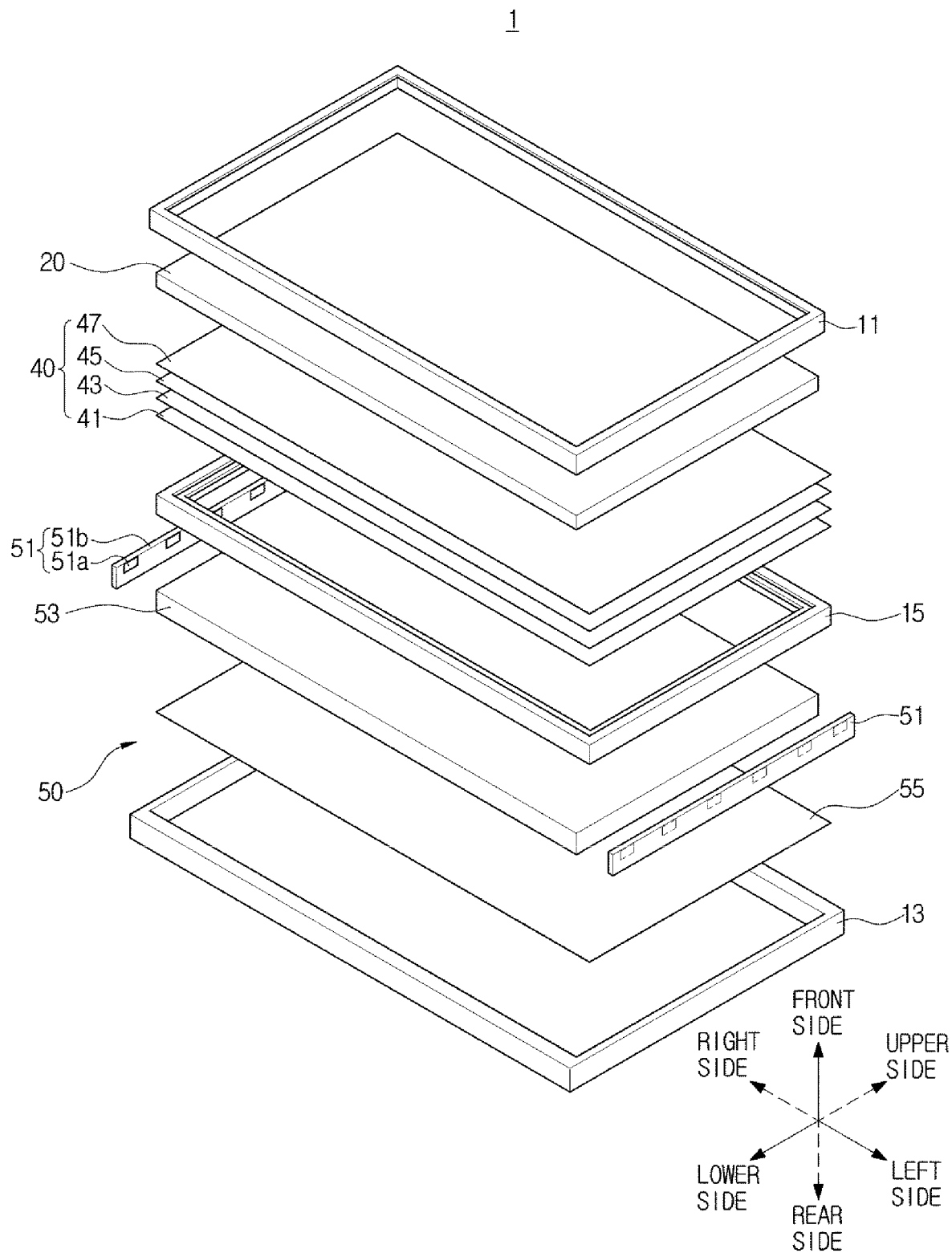
FIGS. 2 and 3 are exploded views schematically illustrating a display apparatus in accordance with different exemplary embodiments.
Figure 3:
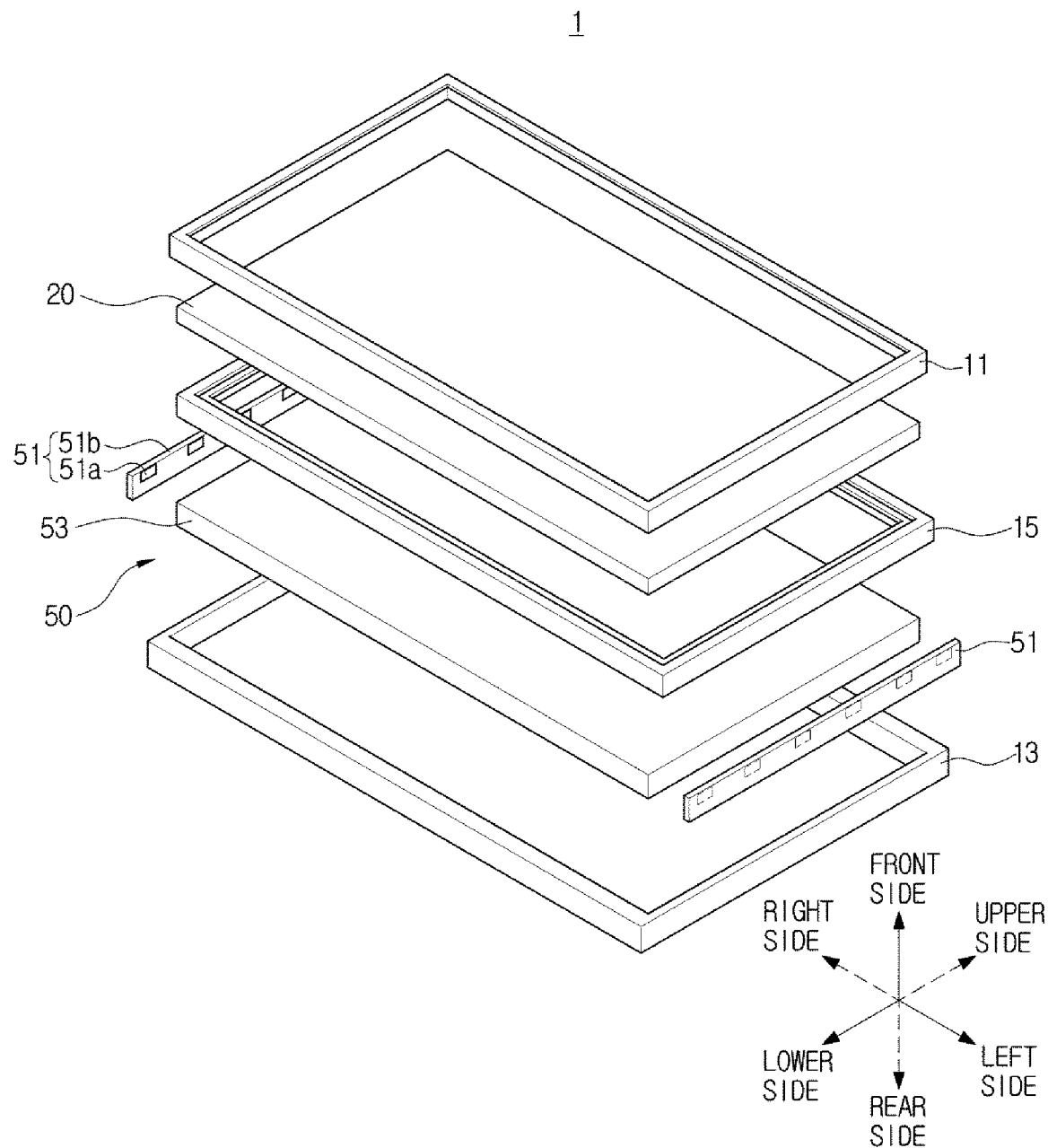

FIG. 1 is a view illustrating an appearance of a display apparatus in accordance with an exemplary, and FIGS. 2 and 3 are exploded views schematically illustrating a display apparatus in accordance with different exemplary embodiments. Hereinafter a description thereof will be described together to prevent duplicate descriptions.

A display apparatus represents an apparatus configured to visually display image data in a variety of formats by having a display panel displaying an image. For example, the display apparatus includes a television (TV), a monitor, and a portable multimedia device, e.g., a personal digital assistant (PDP), and portable multimedia player (PMP). In addition, the display apparatus includes a portable communication device, e.g., a smart phone or a wearable device, e.g., a glass type wearable device or a watch type wearable device.

Hereinafter a display apparatus illustrated in FIG. 1 will be described as an example of the display apparatus, but is not limited thereto. Therefore, embodiments described later can be applied to any apparatus capable of providing a variety of images to a user by having a display panel regardless of the shape.

Referring to FIG. 1, a display apparatus 1 may include a body 10 forming an appearance of the display apparatus 1 and accommodating a variety of components forming the display apparatus 1 and a display panel 20 displaying an image to a user.

The display apparatus 1 as illustrated in FIG. 1 may be implemented as a stand type or a wall-mounted type by a supporting method. According to an exemplary embodiment, the body 10 may be implemented as the wall-mounted type, i.e., the display apparatus is mounted to a vertical surface, e.g., a wall, using a bracket. According to another embodiment, a stand 3 may be provided under the body 10 to support the body 10, and thus the body 10 may stably stand on the plane surface by the stand 3.

On the front of the body 10, a button group receiving a variety of command by a user, and the display panel 20 displaying an image according to the user's command may be provided. Alternatively, a position in which the button group is provided is not limited to the front of the body 10.

The display panel 20 may be provided at the front of the body 10 and display various images. For example, the display panel 20 may display still images or moving images, particularly two-dimensional planar images or three-dimensional image using parallax of both eyes of a user. Hereinafter when there is no need to distinguish between a still image, a moving image, a two-dimensional planar image, a three-dimensional image, etc., it will be collectively referred to an image or image data.

For example, the display panel 20 may include a plurality of pixels (P) and an image displayed on the display panel 20 may be formed by the combination of light emitted from the plurality of pixels (P). In other words, when light emitted the plurality of pixels (P) is combined, an image may be displayed on the display panel 20.

Pixel is the smallest unit constituting an image to be displayed on the display panel 20 and referred to as a dot. Hereinafter for convenience of description, pixel will be collectively used for the description.

The plurality of pixels (P) may emit light in various brightness and colors. For example, each of the plurality of pixels (P) may receive an electrical signal indicating image data and output an optical signal corresponding to the received electric signal. Thus, the optical signal output from the plurality of pixels (P) contained in the display panel 20 may be combined and image data may be displayed on the display panel 20.

The color may be displayed according to a variety of different methods. For example, the color may be displayed in Red Green Blue, (RGB) format and YCbCr (YUV) format using a difference between the brightness and color.

For example, a plurality of third sub-pixels may be provided in the plurality of pixels (P) for displaying the color. According to an exemplary embodiment, when displaying color of the image data in the RGB format, a red sub-pixel (R), a green sub-pixel (G), and a blue sub-pixel (B) may be provided in the plurality of pixels (P). Hereinafter a case of displaying the color using the RGB format will be described as an example, but is not limited thereto. Therefore, embodiments described later may be applied to display apparatuses using a variety of well-known methods, e.g., the YUV format, to display colors.

In the RGB format, a desired color may be displayed by combining red, green and blue color. Therefore, various colors may be represented by adjusting the amount of light transmitted through the red sub-pixel (R), the green sub-pixel (G), and the blue sub-pixel (B). For example, color represented in the pixel may vary according to voltage applied to the red sub-pixel (R), the green sub-pixel (G), and the blue sub-pixel (B), and thus it may be possible to represent a desired color by regulating the voltage.

In this case, the red sub-pixel (R) may emit red light of various brightness, the green sub-pixel (G) may emit green light of various brightness, and the blue sub-pixel (B) may emit blue light of various brightness. For example, the red light may represent light having a wavelength in the range of about 620 nm (nanometer; one billionth of a meter) to about 750 nm, the green light may represent light having a wavelength in the range of about 495 nm to about 570 nm, and the blue light may represent light having a wavelength in the range of about 450 nm to about 495 nm.

According to an exemplary embodiment, the plurality of pixels (P) forming the display panel 20 may further include a white sub-pixel (W) to allow a user to recognize objects placed in the rear side of the display panel 20. The white sub-pixel (W) may be referred to a transparent sub pixel, but hereinafter the white sub-pixel (W) will be used for the description.

As described later, the white sub-pixel (W) may transmit incident light, which is incident in an inclined direction with respect to the front side of the display panel 20, without change, so as to allow a user to recognize a variety of objects in the rear side of the display panel 20. The white sub-pixel (W) may not be provided not to display an image on the display panel 20 but to improve the transparency of the display panel 20 so that a user can recognize a variety of objects in the rear side of the display panel 20. A detail description will be later.

Hereinafter the plurality of pixels (P) may be configured with the red sub-pixel (R), the green sub-pixel (G), the blue sub-pixel (B) and the white sub-pixel (W). A detail description of the internal structure of the display panel 20 will be described later.

Meanwhile, a variety of components may be provided in the body 10 to display an image. Referring to FIGS. 2 and 3, in the body 10, a back light unit (BLU) 50 configured to emit light to the inside of the body 10 and the display panel 20 configured to generate an image by transmitting or blocking the light emitted from the backlight unit 50 may be provided.

As illustrated in FIG. 2, the backlight unit 50 may include a light emitting module 51, a waveguide plate 53, and a reflective sheet 55. Alternatively, the backlight unit 50 may include only the light emitting module 51, and the waveguide plate 53 to increase the transparency, as illustrated in FIG. 3. An optical sheet 40 may be provided in the body 10 as illustrated in FIG. 2, or alternatively the optical sheet 40 may be not provided in the body 10 to increase the transparency, as illustrated in FIG. 3.

The optical sheet 40 refracts or scatters light to expand a viewing angle of the display apparatus 1 and to increase the brightness of the display apparatus 1. The optical sheet 40 may include a variety of sheets. For example, as illustrated in FIG. 2, the optical sheet 40 may include a diffusion sheet 41, a prism sheet 43, a protective sheet 45, and a dual brightness enhancement film (DBEF™). Alternatively, it is difficult that all of the above mentioned sheets are provided in the display apparatus 1, and thus any of the above mentioned sheets may be omitted as needed.

The diffusion sheet 41 may diffuse light emitted from the backlight unit 50 along a surface to make the color and brightness of an entire screen on the display panel 20 look uniform.

Light passed through the diffusion sheet 41 may be diffused in a direction perpendicular to a surface of the diffusion sheet 41, and thus luminance may be rapidly reduced. The prism sheet 43 may refract or condense light diffused by the diffusion sheet 41 thereby increasing the luminance of the light.

The prism sheet 43 may include a prism pattern of a triangular prism shape, and the prism pattern may have a shape of a plurality of bands in which a plurality of prism patterns is disposed adjacent to each other. That is, the prism pattern may be formed to protrude toward the display panel 20 such that a ridge and a valley are repeatedly disposed in a row.

The protection sheet 45 may protect a variety of components constituting the backlight unit 50 from an external impact, and the protection sheet 45 may prevent foreign materials from being introduced into the variety of components constituting the backlight unit 50. Particularly, since scratch is easily generated in the prism sheet 43, the protection sheet 45 may prevent the scratch in the prism sheet 43.

The double brightness enhancement film 47 may transmit polarized light in parallel with a polarization direction of the double brightness enhancement film 47, among lights emitted from the backlight unit 50, and may reflect light in a different direction from the polarization direction of the double brightness enhancement film 47. The double brightness enhancement film 47 may reflect polarized light in a different direction from the polarization direction of the double brightness enhancement film 47. The reflected light may be recycled in the backlight unit 50 and thus the luminance of the display apparatus 1 may be improved due to the light recycle.

The body 10 may include a front chassis 11, a rear chassis 13 and a mold frame 15 to fix the display panel 20 and the backlight unit 50.

The front chassis 11 may be formed in a plate shape having an opening in the front surface thereof. A user may recognize objects in the rear side of the display panel 20 as well as seeing an image displayed on the display panel 20 through the front opening of the front chassis 11.

The rear chassis 13 may be formed in a box shape having an open front surface, and thus a user may be allowed to recognize objects in the rear side of the display apparatus 1. The rear chassis 13 may accommodate the display panel 20 and the backlight unit 50 forming the display apparatus 1. The rear chassis 13 may prevent the variety of components contained in the display apparatus 1 from being exposed to the outside and protect the variety of components contained in the display apparatus 1 from an external impact.

The mold frame 15 may be provided between the front chassis 11 and the rear chassis 13. Particularly, the mold frame 15 may be provided between the display panel 20 and the backlight unit 50 and fix the display panel 20 and the backlight unit 50, respectively.

The backlight unit 50 may include a light source emitting monochromatic light or white light, and the light emitted from the light source may be refracted, reflected and scattered through components in the body 10. A detail description of the backlight unit 50 will be described later.

The display panel 20 is provided in front of the back light unit 50. The display panel 20 may block or transmit light emitted from the backlight unit 50 to generate an image and to increase the transparency so that a user recognizes objects in the rear side of the display panel 20. The display panel 20 may selectively pass the light with predetermined wavelengths to increase the transparency.

As described above, the front surface of the display panel 20 is composed of a plurality of pixels (P) and reproduces an image. The plurality of pixels (P) contained in the display panel 20 may independently block or transmit light of the backlight unit 50, respectively. The display apparatus 1 may allow a user to recognize objects in the rear side of the display panel 20 as well as displaying a variety of images using the light transmitted through the plurality of pixels (P).

The display panel 20 may be implemented in various types of panels. For example, the display panel 20 may be implemented by a cathode ray tube (CRT) display panel, a liquid crystal displays (LCD) panel, a light emitting diode (LED) panel, an organic light emitting diode (OLED), a plasma display panel (PDP), or a field emission display (FED) panel, but is not limited thereto.

In addition, a variety of components may be provided in the body 10 to perform the function of the display apparatus 1. Hereinafter the internal structure of the display apparatus 1 will be described in detail.

Figure 4:
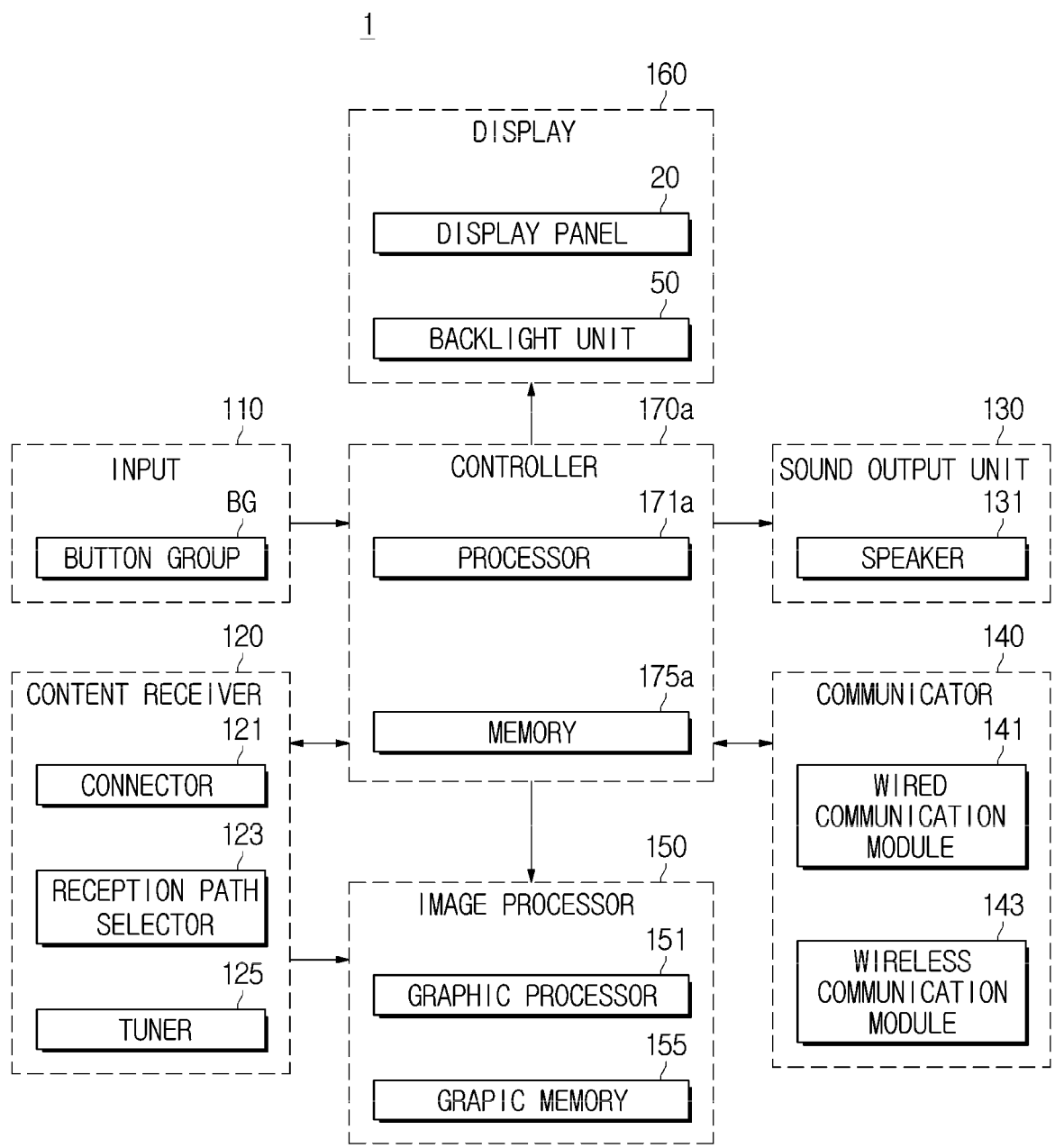
FIG. 4 is a control block diagram of the display apparatus in accordance with an exemplary embodiment.
Figure 5:
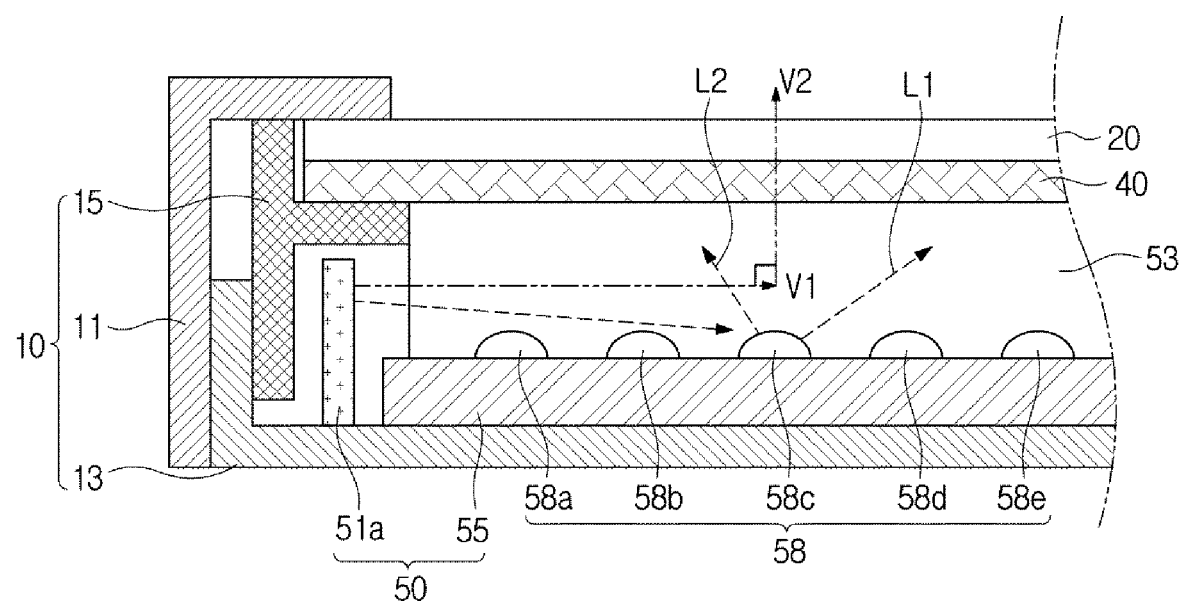
FIG. 5 is a view schematically illustrating a side cross section of the display apparatus in accordance with an exemplary embodiment.
Figure 6:
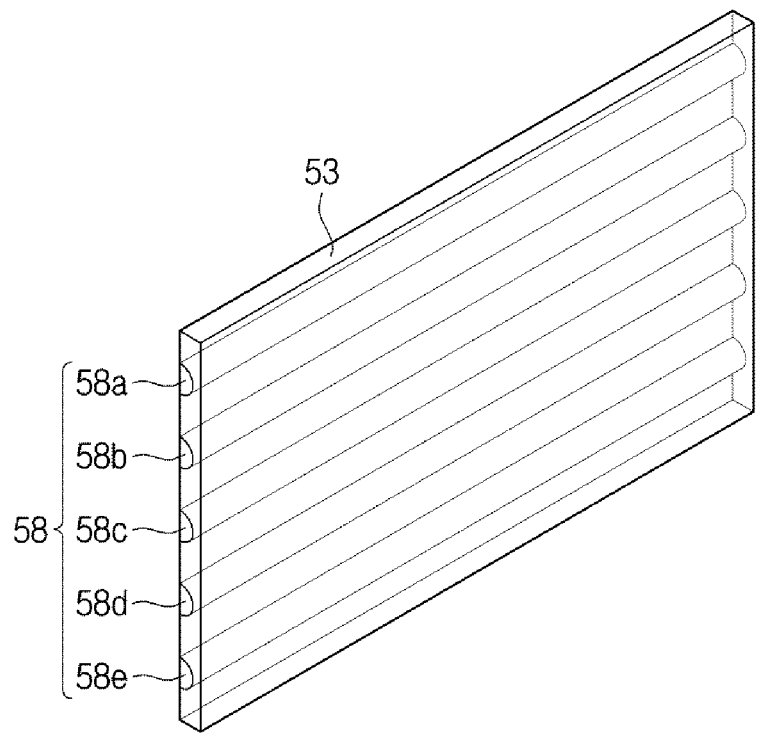
FIGS. 6 and 7 are views illustrating one side of oblique patterns implemented in different forms.
Figure 7:
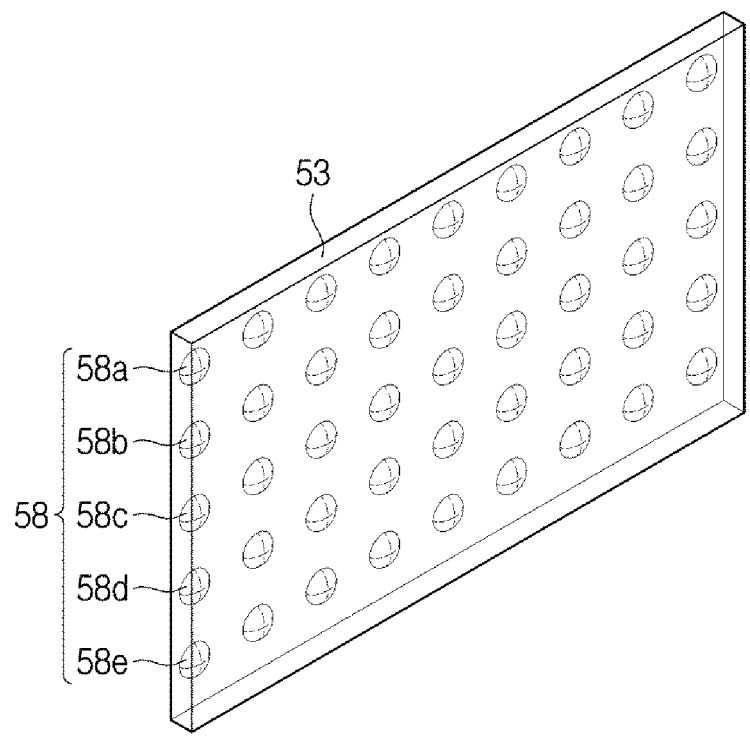
Figure 8:
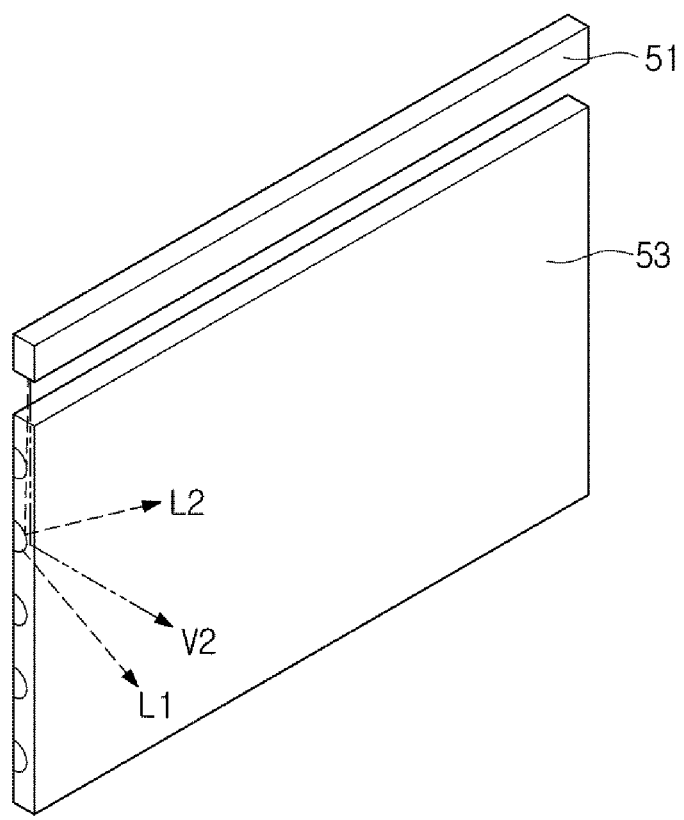
FIG. 8 is a view schematically illustrating a light path output from a waveguide plate in accordance with an exemplary embodiment.
Figure 9:
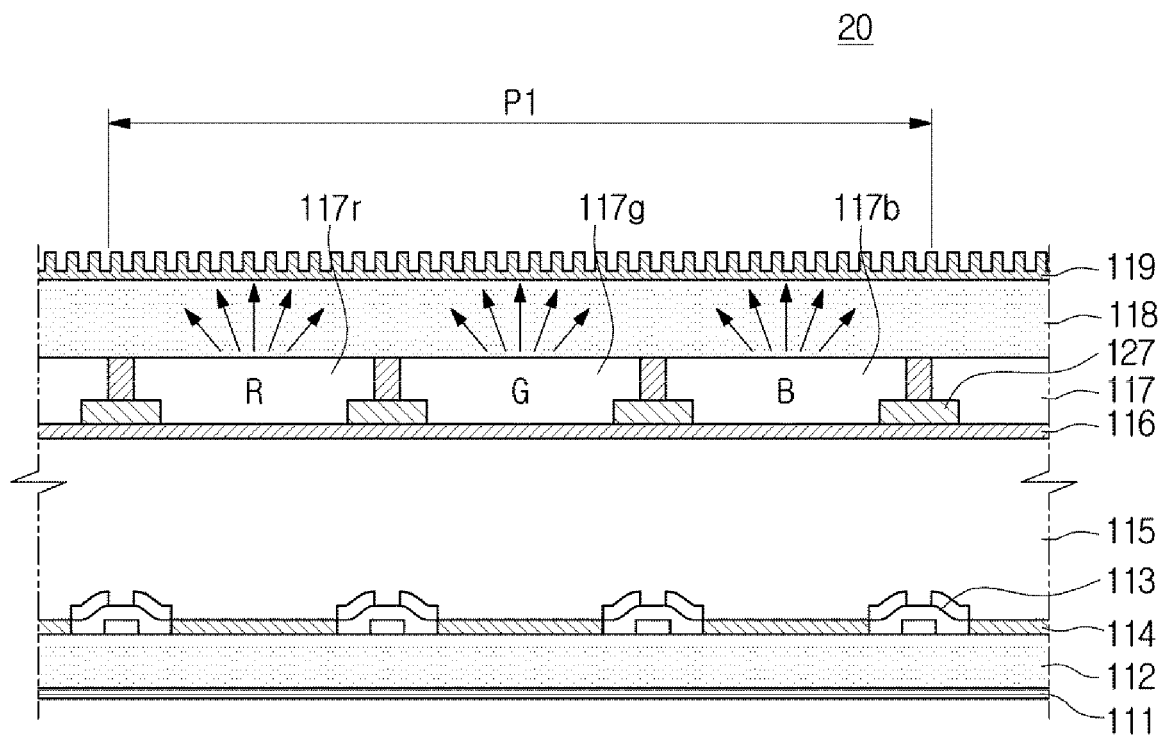
FIGS. 9 and 10 are views a side cross section of a single pixel contained in a display panel in accordance with different exemplary embodiments when viewed from different sides.
Figure 10:
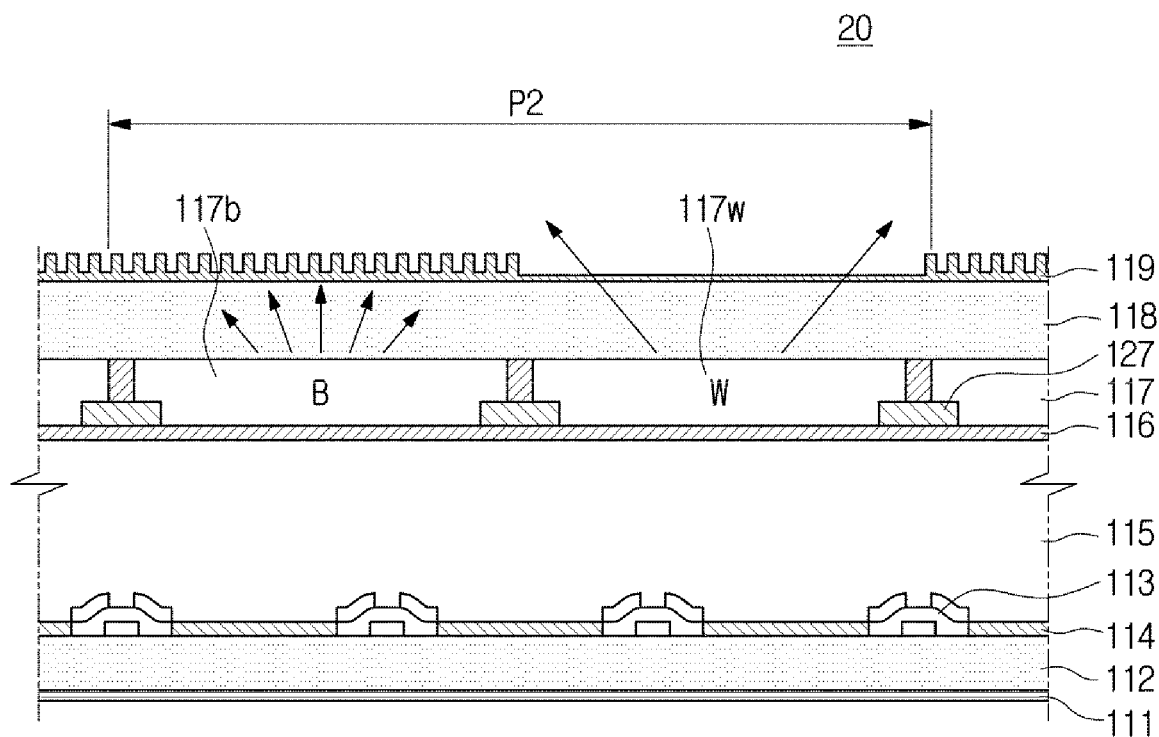
Figure 11:
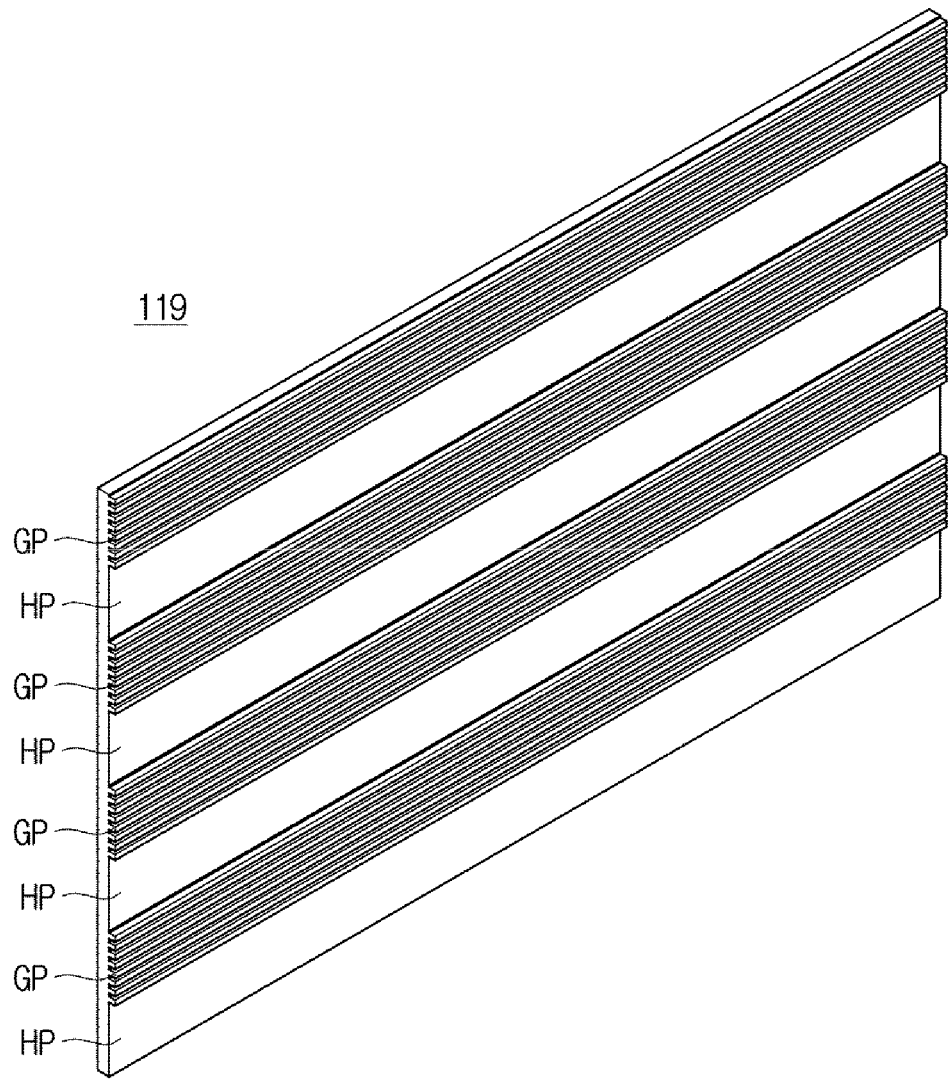
FIG. 11 is a view schematically illustrating a polarizing plate in accordance with an exemplary embodiment.
Figure 12:
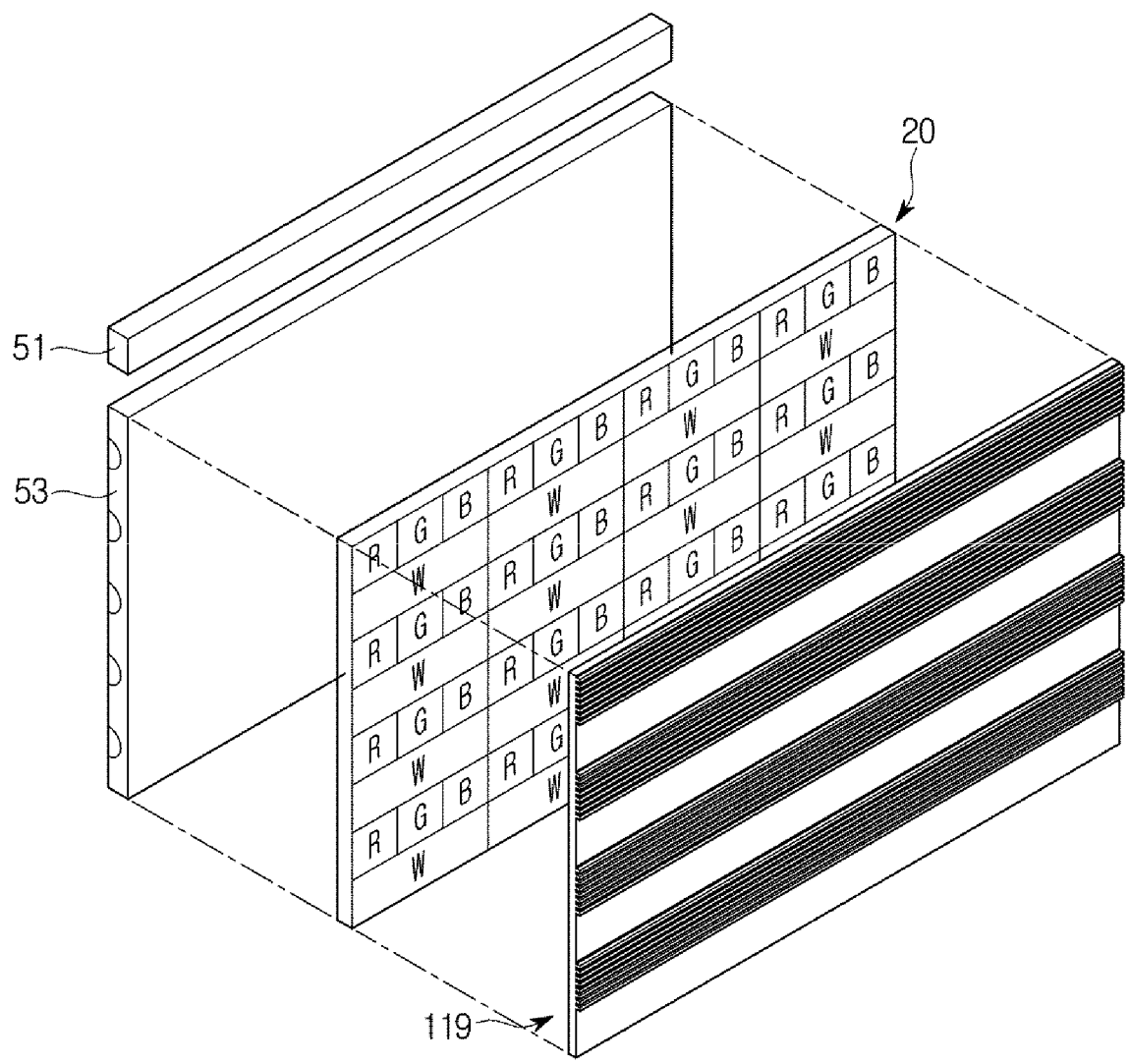
FIG. 12 is an exploded view illustrating a light source, the waveguide plate, a color filter, and the polarizing plate forming the display apparatus in accordance with an exemplary embodiment.
Figure 13:
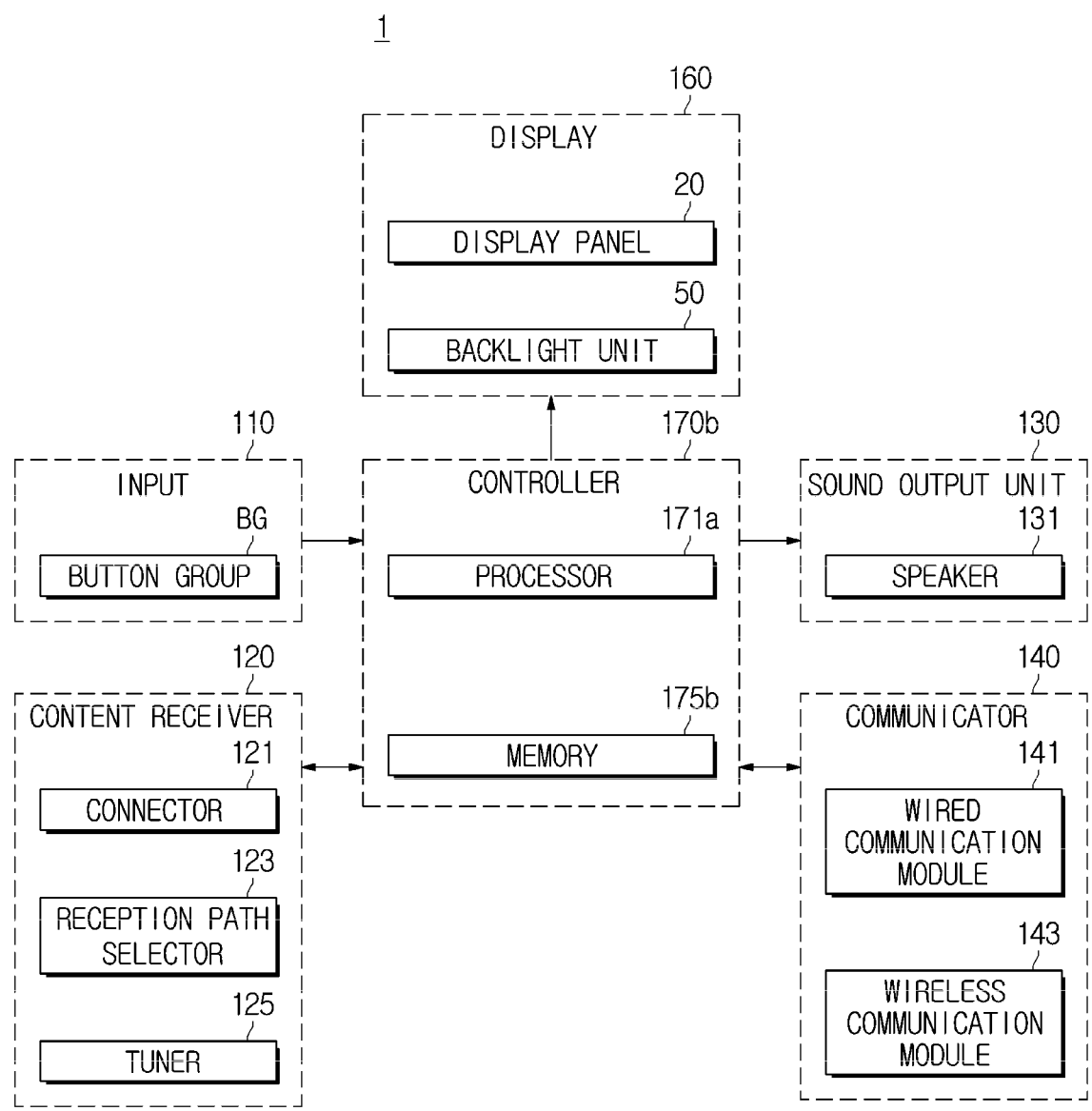
FIG. 13 is a control block diagram illustrating a display apparatus in accordance with another exemplary embodiment different from FIG. 3.

FIG. 4 is a control block diagram of the display apparatus in accordance with an exemplary embodiment, and FIG. 5 is a view schematically illustrating a side cross section of the display apparatus in accordance with an exemplary embodiment. FIGS. 6 and 7 are views illustrating one side of oblique patterns implemented in different forms, and FIG. 8 is a view schematically illustrating a light path output from a waveguide plate in accordance with an exemplary embodiment. FIGS. 9 and 10 are views a side cross section of a single pixel contained in a display panel in accordance with different embodiments when viewed from different sides, and FIG. 11 is a view schematically illustrating a polarizing plate in accordance with an exemplary embodiment. FIG. 12 is an exploded view illustrating a light source, the waveguide plate, a color filter, and the polarizing plate forming the display apparatus in accordance with an exemplary embodiment, and FIG. 13 is a control block diagram illustrating a display apparatus in accordance with another embodiment different from FIG. 3. Hereinafter a description thereof will be described together to avoid duplication of explanation.

Referring to FIG. 4, the display apparatus 1 may include an input 110 receiving a variety of control commands from a user, a content receiver 120 receiving a content including an image and sound from an external device, a sound output unit 130 outputting a sound corresponding to sound data contained in the content, a communicator (e.g., communication interface) 140 transmitting and receiving various kinds of data such as the content via the network, an image processor 150 processing the image data contained in the content, a display 160 displaying an image corresponding to the image data included in the content, and a controller 170 controlling an entire operation of the display apparatus 1.

At least one of the content receiver 120, the communicator 140, the image processor 150, a timing controller 161 and the controller 170 may be integrated in a system-on-chip (SOC) embedded in the display apparatus 1. However, one or more SOC embedded in the display apparatus 1 may be provided and thus the above mentioned components may be integrated in one or more SOC.

The input 110 may receive an input of various control commands from a user.

For example, the input 110 may include a button group (BG), as shown in FIG. 4. Various buttons contained in the BG may be provided on one surface of the display apparatus 1, but is not limited thereto.

According to an exemplary embodiment, the BG may include a volume button regulating the size of the sound output from the sound output unit 130, a channel button to change communication channels received by the content receiver 120, and a power on/off button turning on/off the power of the display apparatus 1. In addition, the input 110 may receive an input of various control commands related to the display apparatus 1 from a user through the above mentioned BG, but is not limited thereto.

Various buttons contained in the BG may employ a push switch and a membrane switch sensing the pressure of the user, or a touch switch sensing a contact of a user's body part, but is not limited thereto. Therefore, the BG may employ various input devices that can output an electrical signal corresponding to the specific operation of the user.

Further, the input 110 may include a remote control configured to remotely receive an input of control commands from a user and configured to remotely transmit a received user control command to the display apparatus 1. In addition, the input 110 may include well-known components configured to receive an input of control command from a user, but is not limited thereto. When the display panel 20 is implemented by a touch screen, the display panel 20 may perform the function of the input 110.

For example, the input 110 may receive an input of the control commands from a user through the display panel 20 implemented by the BG, the remote control, or the touch screen. Accordingly, the input 110 may transmit the received control command to the controller 170 and the controller 170 may control at least one of components of the display apparatus 1 through a control signal. A detail description of the controller 170 will be described later.

The content receiver 120 may receive a variety of content from a variety of external devices. For example, the content receiver 120 may receive contents from an antenna receiving broadcast signals via a wireless network, a set top box receiving broadcast signals via a wired and/or wireless network and properly converting the received broadcast signals, and a multimedia player (e.g., DVD player, CD player, and a Blu-ray player) playing contents stored in the multimedia player.

Particularly, the content receiver 120 may include a plurality of connectors 121 connected to the external device, a reception path selector 123 selecting a path, which is to receive content, among the plurality of connectors to receive content, and a tuner 125 selecting a channel (or frequency), which is to receive a broadcast signal, for receiving broadcast signals.

The connector 121 may include a RF coaxial cable connector receiving a broadcast signal containing the contents from the antenna, a high definition multimedia interface (HDMI) connector receiving the content from the set-top box or the multi-media player, a component video connector, a composite video connector and a D-Sub connector.

The reception path selector 123 may select a connector, which is to receive content, among the above mentioned plurality of connectors 121. For example, the reception path selector 123 may automatically select the connector 121 to which the content is received, or manually select the connector 121, which is to receive the content, according to a user's control command.

The tuner 125 may extract a transmission signal of a specific frequency (channel), among a variety of signals received through the antenna when receiving broadcast signals. In other words, the tuner 125 may select a channel (or frequency) for receiving content according to a user's channel selection command.

When image data about the selected channel is received via the tuner 125, the image data may be transmitted to the image processor 150. Accordingly, the image processor 150 may obtain color data and image control signal from the image data through an image processing, and the communicator 140 may restore the image on the display panel 20 based on the color data and the image control signal.

Further, the display apparatus 1 may be provided with the sound output unit 130. The sound output unit 130 may receive sound data from the content receiver 120 in response to a control signal of the controller 170. The sound output unit 130 may include one or more speaker 131 converting an electrical signal into an acoustic signal.

As illustrated in FIG. 4, the display apparatus 1 may be provided with the communicator 140. The communicator 140 may support a variety of communication systems by having a wireless communication module 141 supporting a wireless communication system and a wired communication module 143 supporting a wired communication system.

Communication system may include a wireless communication system and a wired communication system. The wireless communication system refers to a communication system configured to transmit and receive a signal containing data via a wireless manner. At this time, the wireless communication system may include 3Generation (3G), 4Generation (4G), Wireless LAN (WLAN), Wi-Fi, Bluetooth, ZigBee, Wi-Fi Direct (WFD), Ultra wideband (UWB), infrared data association (IrDA), Bluetooth Low Energy (BLE), Near Field communication (NFC), or Z-wave, but is not limited thereto.

The wireless communication system refers to a communication system configured to transmit and receive a signal containing data via a wired manner. For example, the wired communication system may include Peripheral Component Interconnect (PCI), PCI-express, and Universe Serial Bus (USB), but is not limited thereto. The controller 170 may control an operation of the communicator 140 through a control signal to download a variety of contents via the wired network or the wireless network, thereby providing the content to a user.

The wired communication module 141 and the wireless communication module 143 may be implemented in a single chip, respectively. However, the implementation of the communication module is not limited thereto. Therefore, the wired communication module 141 and the wireless communication module 143 may be integrated in a single chip.

Referring to FIG. 4, the display apparatus 1 may be provided with the image processor 150. As illustrated in FIG. 4, the image processor 150 may include a graphics processor 151 and a graphics memory 155.

The graphics memory 155 may memorize image processing programs for the image processing and processed color data or temporarily memorize image information output from the graphics processor 151 or image information received from the content receiver 120.

The graphics processor 151 may obtain a variety of data needed for restoring an image by processing the image data stored in the graphics memory 155 using the image processing program memorized in the graphics memory 155. For example, the graphics processor 151 may obtain an image control signal and color data by performing the image processing on image data among the contents stored in the graphics memory 155.

The graphics processor 151 and the graphics memory 155 may be implemented in separate chips, respectively. However, the graphics processor 151 and graphics memory 155 are not limited to being implemented as separate chips, respectively, and thus the graphics processor 151 and the graphics memory 155 may be implemented as a single chip. Further, the image processor 150 may be integrated with a controller 170a described later, but the implementation is not limited thereto.

The display apparatus 1 may be provided with the display 160. The display 160 may receive image control signals and color data from the image processor 150 and display image data by operating the display panel 20 based on the received color data.

Referring to FIG. 4, the display 160 may include the backlight unit 50 and the display panel 20. Hereinafter a liquid crystal display panel will be described as an example of the display panel 20, but there is no limitation in applying embodiments described later.

In general, the liquid crystal display panel 20 applies an electric field to a liquid crystal layer in which a liquid crystal material having dielectric anisotropy is injected between two substrates, and regulates an amount of light transmitted through the substrate, thereby displaying the image data.

Particularly, since the liquid crystal display panel 20 cannot emit light by itself, the display 160 may be provided with the backlight unit 50 configured to emit back light to the display panel 20. Accordingly, the display apparatus 1 having the liquid crystal display panel 20 may display desired image data by regulating the transmittance of the backlight passed through the liquid crystal layer by adjusting the intensity of the electric field after applying the electric field to the liquid crystal layer. The backlight unit 50 may be classified into a direct type backlight unit or an edge type backlight unit according to the position of the light source. Hereinafter for convenience of description, the backlight unit 50 implemented as the edge type backlight unit will be described as an example, but the backlight unit 50 is not limited thereto.

Referring to FIGS. 2 to 3, the edge-type back light unit 50 may include the light emitting module 51 generating light and the waveguide plate 53 dispersing the light. Further, as needed, the display apparatus 1 may further include the reflective sheet 55 reflecting light and the optical sheet 40 improving the optical brightness, as illustrated in FIG. 2. Alternatively, the display apparatus 1 may exclude the reflective sheet 55 and the optical sheet 40 to improve the transparency, as illustrated in FIG. 3. That is, it represents that the reflection sheet 55 and the optical sheet 40 are not critical components of the display apparatus 1. Hereinafter for convenience of the description, the display apparatus 1 having the reflection sheet 55 and the optical sheet 40 will be described but the reflective sheet 55 and the optical sheet 40 may be omitted in the display apparatus 1 to improve the transparency.

The light emitting module 51 may include a plurality of light sources 51a emitting light, and a support 51b supporting and fixing the plurality of light sources 51a. As illustrated in FIG. 2, the plurality of light sources 51a may be uniformly disposed on the side surface of the backlight unit 50 and emit light to the center of the backlight unit 50.

The plurality of light sources 51a may be disposed at the same distance so that light emitted from the plurality of light sources 51a have the same brightness as possible as. For example, as illustrated in FIG. 2, the plurality of light sources 51a may be disposed at the same distance on the left and right side of the backlight unit 50. However, the arrangement of the light source 51a is not limited to FIG. 2, and thus the light source 51a may be disposed on any one of the left and right side of the backlight unit 50.

The light source 51a may employ a light emitting element wherein the light emitting element is configured to emit monochromatic light (light having a certain wavelength, e.g., blue light of a particular wavelength of light) or white light (mixture of different-wavelength light) in different directions. For example, the light source 51a may employ a Light Emitting Diode (LED), a Cold Cathode Fluorescence Lamp (CCFL), and a laser (LASER). According to an exemplary embodiment, a blue LED that emits high-energy blue light may be used as the light source 51a. Hereinafter for convenience of description, the light source 51a emitting the blue light will be described as an example, but is not limited thereto. Therefore, any kind of light source capable of emitting light having a predetermined wavelength or less may be used as the light source 51a.

The support 51b may fix the plurality of light sources 51a so that the position of the light source 51a is not changed. The support 51b may supply the power to the light source 51a each so that the light source 51a emits light.

The support 51b may be disposed with the light source 51a on the side surface of the backlight unit 50. For example, as illustrated in FIG. 2, the support 51b may be disposed on the left and right side of the backlight unit 50. However, the arrangement of the support 51b is not limited to FIG. 2, and thus the support 51b may be disposed on any one of the left and right side of the backlight unit 50. The support 51b may fix the plurality of light sources 51a and formed of synthetic resin in which a conductive power supply line is provided to supply the power. The support 51b may be implemented by a printed circuit board (PCB) or a flexible circuit board (FPCB).

The waveguide plate 53 may change a traveling direction of light incident from the light emitting module 51 in the side surface, and emit the light toward the display panel 20.

Referring to FIGS. 1 and 5, when a large amount of light is emitted to a vertical direction (V2) of an optical axis (V1) of the light source 51a, that is the front side of the display panel 20, the light may be transmitted via a hole pattern (HP) described later, which is provided in the waveguide plate 53, without filtering. Therefore, it may cause the decrease of the resolution of the image and it may be difficult for a user to recognize objects in the rear side of the display panel 20. According to an exemplary embodiment, a slope pattern 58 may be formed on the waveguide plate 53 to change the traveling direction of the light, i.e., an emission direction.

The slope pattern 58 may represent a pattern configured to allow light emitted from the light source 51a to be directed to the left side or the right side with respect to the vertical direction (V2) of an optical axis (V1) of the light source 51a. In other words, the slope pattern 58 provided in the waveguide plate 53 may prevent the light from outputting to the vertical direction (V2) of an optical axis (V1). For example, as illustrated in FIG. 5, first to fifth slope patterns 53a, 53b, 53c, 53d, and 53e may be provided in the inside of the waveguide plate 53.

The shape of the slope pattern 58 may vary. For example, as illustrated in FIG. 6, the slope pattern 58 may include the first to fifth slope patterns 53a, 53b, 53c, 53d, and 53e formed in a plurality of convex strip shape. Alternatively, the slope pattern 58 may include first to fifth slope patterns 53a, 53b, 53c, 53d, and 53e formed in a plurality of dots shape.

In this time, the size and the distance of the first to fifth slope patterns 53a, 53b, 53c, 53d, and 53e may be predetermined. In other words, the slope pattern 58 may be formed to allow an angle of outgoing light output via the waveguide plate 53 to have an obtuse angle with respect to at least one optical axis among the light source of the light emitting module 51 provided in the right side or the left side of FIG. 2. However, there is no limitation in the implementation of the slope pattern 58.

In addition, the slope pattern 58 may be formed through a variety of techniques. For example, the slope pattern 58 may be formed by a print technique, particularly, by printing a white resin. Alternatively, the slope pattern 58 may be formed by irradiating laser. In addition, the slope pattern 58 may be formed by a stepping technique, particularly, by putting a substrate in which a slope pattern is pre-formed, on the upper surface of the waveguide plate 53 and applying the pressure.

The waveguide plate 53 may be formed by using a material having high transparency so that a user recognizes object in the rear side of the display panel 20. For example, the waveguide plate 53 may employ poly methyl methacrylate (PMMA) or polycarbonate (PC), but is not limited thereto.

Referring to FIGS. 5 and 8, a part (L1) of the light incident to the inside of the waveguide plate 53 may be output to the right side with respect to the vertical direction (V2) of the optical axis (V1) by the slope pattern 58 of the waveguide plate 53. In other words, a part (L1) of the light incident to the inside of the waveguide plate 53 may be output to the lower side with respect to the front side of the display panel 20.

In addition, a part (L2) of the light incident to the inside of the waveguide plate 53 may be output to the left side with respect to the vertical direction (V2) of the optical axis (V1) by the slope pattern 58 of the waveguide plate 53. In other words, a part (L2) of the light incident to the inside of the waveguide plate 53 may be output to the upper side with respect to the front side of the display panel 20.

According to an exemplary embodiment, the display apparatus 1 may increase the transparency by preventing the light from being output to the front side of the display panel 20 through the slope pattern 58. Accordingly, a user can recognize object in the opposite side of the display panel 20.

When the light emitted from the light source 51a is output to the left or right side with respect to the vertical direction (V2) of the optical axis (V1), the resolution of the image displayed on the display panel 20 may be reduced. Therefore, according to an exemplary embodiment, the display apparatus 1 includes at least one of phosphor and scatter in the color filter on the red sub-pixel (R), the green sub-pixel (G), and the blue sub-pixel (B) to prevent the decrease of the resolution of the image by scattering the light output from each pixel (R, G, and B).

The display apparatus 1 may implement the color filter on the white sub-pixel as an empty state or a hole state. The display apparatus 1 may allow a user to recognize object in the rear side of the display panel 20 by injecting a material having a high transparency, which does not change a light path, to the color filter on the white sub pixel (W). Hereinafter the liquid crystal display panel 20 will be described in detail.

Referring to FIG. 9, the liquid crystal display panel 20 may include a first polarizing plate 111, a first transparent substrate 112, a thin film transistor 113, a pixel electrode 114, a liquid crystal layer 115, a common electrode 116, a color filter layer 117, a second transparent substrate 118, and a second polarizing plate 119.

The first transparent substrate 112 and the second transparent substrate 118 may form an appearance of the liquid crystal display panel 20 and protect the liquid crystal layer 115 and the color filter layer 117 provided between the first transparent substrate 112 and the second transparent substrate 118. The first and second transparent substrate 112 and 118 may be formed of a material having a high transparency, e.g., tempered glass or a transparent resin, but is not limited thereto.

According to an exemplary embodiment, the display apparatus 1 may be implemented by the transparent substrate 112 and 118 and the display apparatus 1 may allow a user to recognize object in the rear side thereof using the display panel 20 having the white sub pixel (W).

Referring to FIG. 5, the first polarizing plate 111 and the second polarizing plate 119 may be provided in the outside of the first transparent substrate 112 and the second transparent substrate 118. The first polarizing plate 111 may be referred to as a lower polarizing plate and the second polarizing plate 119 may be referred to as an upper polarizing plate.

Light is composed of a pair of an electric field and a magnetic field which are vibrated in a direction perpendicular to the travel direction of the light. The electric field and magnetic field may be vibrated in all directions perpendicular to the traveling direction of the light. A phenomenon in which the electric field or the magnetic field is vibrated only in a certain direction is referred to as a polarizing light, and a polarizing plate only transmits light containing the electric field or the magnetic field vibrated in a predetermined direction and blocks light containing the electric field or the magnetic field vibrated in a direction except for the predetermined direction. In other words, the polarizing plate may transmit light vibrated in a predetermined direction and block light vibrated in other direction.

The first polarizing plate 111 transmits light containing the electric field and the magnetic field vibrated in a first direction and blocks other light. The second polarizing plate 119 transmits light containing the electric field and the magnetic field vibrated in a second direction and blocks other light.

The first direction and the second direction may be the same or different. For example, the first direction and the second direction may be perpendicular to one another. In this case, a polarization direction of light transmitted by the first polarizing plate 111 and a vibration direction of light transmitted by the second polarizing plate 119 may be perpendicular to one another. Accordingly, light cannot simultaneously pass through the first polarizing plate 111 and the second polarizing plate 119.

According to an exemplary embodiment, a polarizing pattern is provided in a part of the second polarizing plate 119 so that the second polarizing plate 119 may transmit light having the electric field and the magnetic field vibrated in the second direction and a hole pattern is provided in other part of the second polarizing plate 119 so that light passed through the color filter may be transmitted without change. According to an exemplary embodiment, the light may be not polarized in the entire of the second polarizing plate 119.

For example, the second polarizing plate 119 may include a wire grid polarizer (WGP) in which a nano-size grid pattern is provided wherein the grid pattern is made such that a conductive wire formed of metal is arranged in a grid pattern with a certain pitch.

The second polarizing plate 119 may be formed by a part in which the polarizing pattern is formed to polarize incident light, and another part in which a hole pattern is formed to transmit incident light without changes.

For example, referring to FIGS. 9 to 11, a grid pattern (GP) of the second polarizing plate 119 corresponding to the polarizing pattern may be disposed in a region corresponding to the red sub-pixel (R), the green sub-pixel (G), and the blue sub-pixel (B) among the sub pixels. For another example, referring to FIGS. 10 and 11, the hole pattern (HP) of the second polarizing plate 119 may be disposed in a region corresponding to the white sub-pixel (W).

When light is incident to the region in which the grid pattern (GP) of the second polarizing plate 119 is formed, the grid pattern (GP) may perform the polarization by transmitting light having the electric field and the magnetic field vibrated in the second direction and blocking another light. When light is incident to the region in which the HP is formed, i.e., the grid pattern (GP) is not formed, the HP may transmit the light without changes.

The position of the hole pattern (HP) is not limited to the region corresponding to the white sub-pixel (W). In other words, the size of the region in which the hole pattern (HP) is disposed may not be the same as the size of the region in which the white sub-pixel (W) is disposed. For example, the area of the region of the hole pattern (HP) and the area of the region of the white sub-pixel (W) may be determined in advance. In other words, a ratio between the total area of the region of the hole pattern (HP) and the total area of the region of the white sub-pixel (W) may be determined in advance. According to an exemplary embodiment, it may be designed that the total area of the region of the hole pattern (HP) is in the range of 100% to 120% with respect to the total area of the region of the white sub-pixel (W) so that the polarization and the transmission are appropriately performed.

According to an exemplary embodiment, the display apparatus 1 may allow light, which is emitted to display an image, e.g., light emitted from the red sub-pixel (R), the green sub-pixel (G), and the blue sub-pixel (B), to be polarized and allow light emitted from the white sub-pixel (W) to be emitted to a region that does not affect a user, by the slope pattern 58. Accordingly, light emitted from at least one of the red sub-pixel (R), the green sub-pixel (G), and the blue sub-pixel (B) is combined and thus the user may see an image while recognizing objects in the rear side of the display apparatus 1 using the white sub-pixel (W). In addition, when a user does not watch an image, the controller 170a may perform a transparent mode to allow the user to recognize object in the rear side of the display apparatus 1 by controlling the drive power applied to the backlight unit 50, and the liquid crystal display panel 20. "Transparent mode" represents a mode in which the display panel 20 has a transmittance or a transparency above a certain level and thus a user recognizes objects disposed in the opposite side with respect to the display apparatus 1 in a state in which an image is not displayed via the display panel 20. A detail description thereof will be described later.

The color filter layer 117 may be provided inside of the second transparent substrate 118. Referring to FIG. 9, in the color filter layer 117, a red color filter 117r transmitting red light, a green color filter 117g transmitting green light, and a blue color filter 117b transmitting blue light may be provided. The red color filter 117r, the green color filter 117g, and the blue color filter 117b may be arranged side by side. Referring to FIG. 10, the color filter layer 117 may further include a transparent color filter 117w transmitting incident light without changes.

A region in which the color filter layer 117 is formed may correspond to the above mentioned pixel (P). A region in which the red color filter layer 117r is formed may correspond to the red-sub pixel (R), a region in which the green color filter layer 117g is formed may correspond to the green-sub pixel (G), a region in which the blue color filter layer 117b is formed may correspond to the blue-sub pixel (B), and a region in which the transparent color filter layer 117w is formed may correspond to the white-sub pixel (W).

When the area of the region of the white-sub pixel (W) is significantly less than the total area of the region of the red-sub pixel (R), the green-sub pixel (G), and the blue-sub pixel (B), the transparency may be lowered, but when the area of the region of the white-sub pixel (W) is significantly greater than the total area of the region of the red-sub pixel (R), the green-sub pixel (G), and the blue-sub pixel (B), the resolution of the image may be lowered.

Therefore, a ratio between the area of the region of the white-sub pixel (W) and the total area of the region of the red-sub pixel (R), the green-sub pixel (G), and the blue-sub pixel (B) may be determined in advance. For example, it may be designed that the area of the region of the white-sub pixel (W) is in the range of 80% to 120% with respect to the total area of the region of the red-sub pixel (R), the green-sub pixel (G), and the blue-sub pixel (B), but is not limited thereto. Accordingly, the radio between the area of the region of the white-sub pixel (W) and the total area of the region of the red-sub pixel (R), the green-sub pixel (G), and the blue-sub pixel (B) forming the pixel of the display panel 20 may be determined in advance in consideration with the resolution and the transparency.

The color filter layer 117 may be provided with a black matrix 127 to prevent the color interference among the red color filter 117r, the green color filter 117g, the blue color filter 117b, and the transparent color filter 117w, and to prevent light to be leaked to a part except for the red color filter 117r, the green color filter 117g, the blue color filter 117b, and the transparent color filter 117w. The black matrix 127 may be provided among the red color filter 117r, the green color filter 117g, the blue color filter 117b, and the transparent color filter 117w.

When light is refracted by the slope pattern 58 (refer to FIG. 5), the resolution of the image, which is displayed by a combination of light emitted from the red-sub pixel (R), the green-sub pixel (G), and the blue-sub pixel (B), may be lowered. Accordingly, any one of phosphor or scatter may be injected into any one of the red, green, and blue color filter 117r, 117g, and 117b disposed on the color filter layer 117.

For example, phosphor having quantum dot (QD) may be injected into the red and green color filter 117r and 117g. The red and green color filter 117r and 117g each may include different quantum dot (QD) according to the color conversion.

Quantum dot particles represent semiconductor particles in a small sphere shape, wherein the size of the sphere is about nanometer (nm; one billionth of a meter), and formed with a core of about 2 nm to 10 nm and a shell formed of zinc sulfide (ZnS). The core of the quantum dot may include cadmium selenite (CdSe), cadmium telluride (CdTe), or cadmium sulfide (CdS).

When the voltage is applied, the quantum dots is self-emitting light or emits light having a certain wavelength by absorbing the light. As the size of the quantum dots is small, the quantum dots may emit light having short wavelength and as the size of the quantum dots is large, the quantum dots may emit light having long wavelength. For example, quantum dots having a diameter of about 2 nm may emit blue light, and quantum dots having a diameter of about 10 nm may emit red light. Therefore, according to embodiments, phosphor having different size of quantum dot (QD) may be injected into the red and green color filter 117r and 117g and thus the red and green color filter 117r and 117g may transmit different color lights.

Since the phosphor is excited by the short-wavelength light and coverts the light color, it may be appropriate to use a light source emitting light having a wavelength equal to or less than a predetermined level. Hereinafter a blue color LED and a blue laser emitting a short-wavelength blue light will be used as the light source, but is not limited thereto.

As for the blue color filter layer 117b, when emitting the blue light, the color conversion of the blue light may be not required and the blue color filter layer 117b may scatter incident blue light by the scatter. Titanium dioxide ($TiO_2$) and silicon dioxide ($SiO_2$) may be used as the scatter, but is not limited thereto.

According to embodiments, since the phosphor or the scatter is injected into the red, green, and blue color filter 117r, 117g, and 117b, the red, green, and blue color filter 117r, 117g, and 117b may scatter light refracted by the slope pattern 58, thereby improving the resolution of the image.

In contrast, only when light introduced to the transparent color filter 117w does not affect a user, the user may recognize objects in the rear side of the liquid crystal display panel 20. Therefore, as illustrated in FIG. 10, the transparent color filter 117w may transmit light introduced from the waveguide plate 53 without change, and allow the light to output to the region that does not affect a user. For this, light transmitted through the transparent color filter 117w may be output to the upper or lower side with respect to the front side of the liquid crystal display panel 20, via the hole pattern (HP; refer to FIG. 11).

For example, referring to FIG. 12, light reflected through the polarizing plate 53 may be introduced into the liquid crystal display panel 20. The light may be color converted, scattered and then transmitted in the red-sub pixel (R), and the green-sub pixel (G) forming the pixel on the liquid crystal display panel 20. The light may be scattered and then transmitted in the blue-sub pixel (B) forming the pixel on the liquid crystal display panel 20. Sequentially, the grid pattern (GP) of the second polarizing plate 119 may polarize and output the light transmitted through the red-sub pixel (R), the green-sub pixel (G) and the blue-sub pixel (B), and thus it may be possible to preserver the resolution of the image.

Meanwhile, the white-sub pixel (W) forming the pixel on the liquid crystal display panel 20 may transmit the introduced light without change. The hole pattern (HP) of the second polarizing plate 119 may output the transmitted light to the region that does not affect a user. Therefore, the user may identify the rear side of the display apparatus 1 through the white-sub pixel (W).

The display apparatus 1 may further be provided with the controller 170a. The controller 170a may include a processor 171a and a memory 175a, as illustrated in FIG. 4.

The memory 175a may memorize control programs and control data for controlling the operation of the display apparatus 1, and temporarily memorize control command input via the input 110 or control signal output by the processor 171a. Accordingly, the processor 171a may process a variety of data according to the control program memorized in the memory 175a.

In addition, the memory 175a may store data related to the ratio between the area of the region of the white-sub pixel (W) and the total area of the region of the red-sub pixel (R), the green-sub pixel (G), and the blue-sub pixel (B).

The processor 171a may control the overall operation of the display apparatus 1. The processor 171a may generate control signals for controlling each component of the display apparatus 1 to control the operation of each of the component.

For example, the processor 171a may control the communicator 140 through a control signal so that the communicator 140 may send and receive a signal including data to and from an external device. According to another embodiment, the processor 171a may transmit a control signal to the sound output unit 130 in response to a sound control command input through the input 110, so as to allow the size of the sound output through the speaker 131 to be regulated.

For another example, the processor 171a may control the image processor 150 so that the image processor 150 may perform an image processing on the content received from the content receiver 120, and the processor 171a may control the display 160 so that the display 160 displays the image processed image.

According to an exemplary embodiment, the processor 171a may control the image processor 150 through a control signal so that the image processor 150 obtains color data and an image control signal from the image data of the content received from the content receiver 120. The processor 171a may control the image processor 150 and the display 160 through a control signal to allow image data to be displayed on the liquid crystal display panel 20 based on the obtained color data and image control signal. Particularly, the processor 171a may display an image by controlling the common electrode 116 and the pixel electrode 114 through a control signal based on the obtained color data and image control signal.

The processor 171a may change an amount of passed light or an amount of reflected light among light emitted from the backlight unit 50, by controlling the drive voltage applied to the pixel electrode 114 based on the ratio between the area of the region of the white-sub pixel (W) and the total area of the region of the red-sub pixel (R), the green-sub pixel (G), and the blue-sub pixel (B).

For example, when the area of the region of the white-sub pixel (W) is 80% of the total area of the region of the red-sub pixel (R), the green-sub pixel (G), and the blue-sub pixel (B), the processor 171a may set the drive power to be greater than when the area of the region of the white-sub pixel (W) is 100% of the total area of the region of the red-sub pixel (R), the green-sub pixel (G), and the blue-sub pixel (B). That is, the processor 171a may set the drive power to be relatively greater as the area of the region of the white-sub pixel (W) is lager than the total area of the region of the red-sub pixel (R), the green-sub pixel (G), and the blue-sub pixel (B). Therefore, the reduction in the resolution of the image may be prevented. The data related to the ratio between the area of the region of the white-sub pixel (W) and the total area of the region of the red-sub pixel (R), the green-sub pixel (G), and the blue-sub pixel (B) may be stored in the memory 175a.

For another example, the processor 171a may control applying the drive power for controlling the liquid crystal display panel 20 and the backlight unit 50 through a control signal so as to control any one of an image display mode or the transparent mode.

The amount of light passed through or reflected by a liquid material provided in the liquid crystal layer 115 (refer to FIG. 5) of the liquid crystal display panel 20 may be related to the applied drive power. Particularly, the amount of transmitted or reflected light emitted from the backlight unit 50 may vary according to the voltage applied to the pixel electrode 114 (refer to FIG. 5).

For example, when the processor 171a stops applying the drive power through a control signal, the liquid crystal layer 115 on the liquid crystal display panel 20 may become opaque and thus no image may be displayed on the display panel 20. Accordingly, a user may not recognize objects in the rear side of the liquid crystal display panel 20 via the white sub pixel (W).

According to another embodiment, the processor 171a may apply the drive power to the liquid crystal display panel 20 while stopping applying the drive power to the backlight unit 50 through a control signal. In this case, since the drive power is not applied to the backlight unit 50, no image may be displayed on the liquid crystal display panel 20. However, since the liquid crystal layer 115 on the liquid crystal display panel 20 is not opaque, a user may recognize objects in the rear side of the liquid crystal display panel 20.

In general, when drive power is not applied to the liquid crystal display panel 20, the liquid crystal display panel 20 may become opaque and thus it may give a bad influence on the aesthetic of the environment in which the liquid crystal display panel 20 is placed. However, according to an exemplary embodiment, the display apparatus 1 may provide the improved transparency so as to improve the aesthetic of the environment in which the display apparatus 1.

According to another embodiment, the processor 171a may apply the drive power to the liquid crystal display panel 20 and the backlight unit 50 through a control signal. In this case, a user may recognize objects in the rear side of the liquid crystal display panel 20 while watching the image on the liquid crystal display panel 20.

Hereinbefore the processor 171a and the memory 175a have been described to be separate chips, respectively. However, the processor 171a and the memory 175a are not limited to being implemented as separate chips, respectively, and thus the processor 171a and the memory 175a may be implemented as a single chip.

Referring to FIG. 13, some or all of components of the image processor 150 may be included in a controller 170b. That is, the controller 170b may integrally or partially perform the operation of the image processor 150 of FIG. 4, but is not limited thereto. For example, data stored in the graphics memory 155 (refer to FIG. 4) may be integrally stored in a memory 175b (refer to FIG. 13) of the controller 170b, and a processor 171b of the controller 170b may integrally perform the operation that is performed by the graphics processor 151 (refer to FIG. 4). Since only the subject of the above mentioned operation is switched from the image processor 150 to the controller 170b while the operation is the same, a detail description will be omitted. Hereinafter the operation flow of the display apparatus will be simply described.

Figure 14:
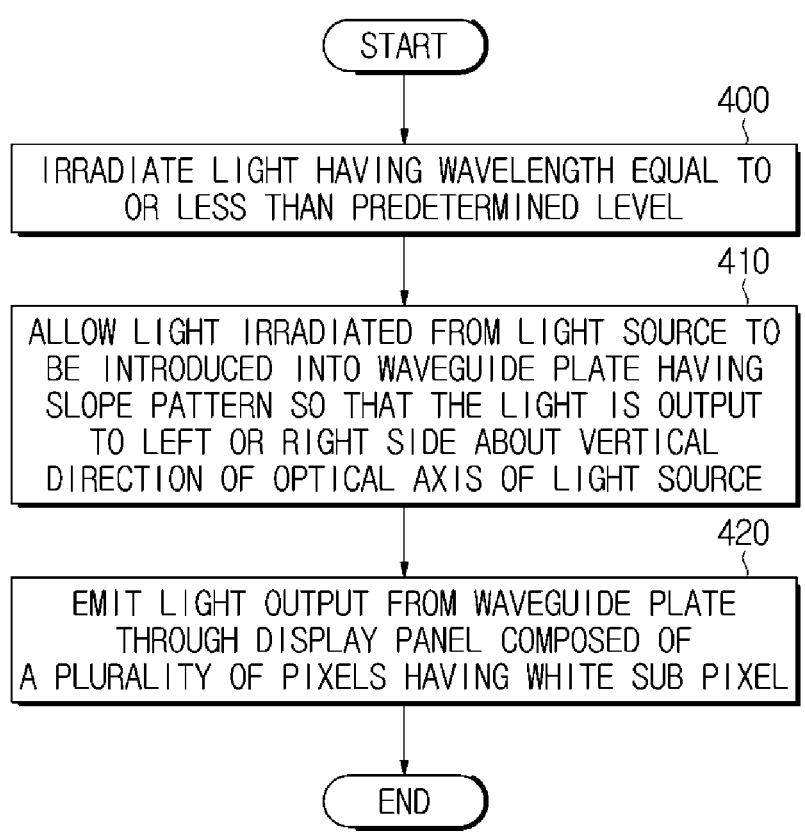
FIG. 14 is a view schematically illustrating an operation flow of the display apparatus in accordance with an exemplary embodiment.

FIG. 14 is a view schematically illustrating an operation flow of the display apparatus in accordance with an exemplary embodiment.

The display apparatus may emit light having a wavelength equal to or less than the predetermined level, using the light source (operation 400). As mentioned above, the phosphor may be injected into the color filter of the display apparatus to compensate the light refracted by the slope pattern of the waveguide plate. In other words, the display apparatus may emit short-wavelength light, e.g., blue light (operation 400).

Accordingly, the light irradiated from the light source may be introduced into the waveguide plate (operation 410), and since the slope pattern is provided in the waveguide plate, the display apparatus may output the light to the left or right side with respect to the vertical direction of the optical axis of the light source. Therefore, the light output from the waveguide plate may be introduced to the pixel via the liquid crystal layer. In this case, the color filter provided in the pixel may include any one of the phosphor or the scatter, and thus at least one of the color conversion and scattering may be performed. A detail description thereof has been described and thus it will be omitted.

The display apparatus may emit the light emitted from the waveguide plate through the plurality of pixels containing the white sub-pixel as well as the red sub-pixel, the green sub-pixel, and the blue sub pixel (operation 420) and thus the display apparatus may perform the transparent mode and displaying an image.

Transparent mode may represent a mode of controlling the display apparatus 1 to allow a user to recognize objects in the rear side of the liquid crystal display panel 20 by improving the transparency of the liquid crystal display panel 20, regardless of the image displaying.

For example, the display apparatus may control at least one of the transparent mode and the image display mode by controlling the drive power to be applied to the backlight unit and the display panel.

As mentioned above, among the light irradiated from the light source, the light output through the white sub pixel may not affect a user and thus the user may recognize objects in the rear side of the liquid crystal display panel using the white sub pixel.

The display apparatus may provide at least one of the transparent mode and the image display mode by allowing the liquid crystal display panel not to be opaque by controlling the drive power applied to the liquid crystal display panel. According to whether the display apparatus applies the drive power to the backlight unit or not, whether the image is displayed on the liquid crystal display panel in the transparent mode may be determined.

Whether the transparent mode is executed in a state in which the image is not displayed may be predetermined or set through the input 110 (refer to FIG. 4) by a user. For example, a button configured to receive a control command related to the execution of the transparent mode may be provided in the BG (refer to FIG. 4) of the input 110 (refer to FIG. 4) or the remote control. Therefore, a user may input a control command related to the execution of the transparent mode through the BG (refer to FIG. 4) of the input 110 (refer to FIG. 4) or the remote control.

As is apparent from the above description, according to the proposed display apparatus and method of controlling thereof, it may be possible for a user to recognize objects in the rear side of the display apparatus.

In addition, it may be possible to improve the aesthetics of the environment where the display apparatus is located, and the method of controlling thereof.

Also, terms used herein are used to described embodiments, and thus there is no intention to limit/or restrict the present disclosure. Expression in the singular should be understood to include multiple representations unless it represents clearly different meaning in the context. Terms such as "comprising", "providing" or "having" are intended to designate the presence of features, numbers, steps, operations, elements, or components or a combination thereof, but it does not preclude the presence or addition of a part or a combination of these things.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

In the following description, terms such as "part", "module" and "unit" indicate a unit for processing at least one function or operation, wherein the unit and the block may be embodied as software or hardware, such as Field Programmable Gate Array (FPGA), Application Specific Integrated Circuit (ASIC), or embodied by combining hardware and software. However, the term "part" "module" and "unit" are not limited to software or hardware. Further, "part" "module" and "unit" may be constructed to exist in an addressable storage module, or to play one or more processors. "part" "module" and "unit" includes elements (e.g., software elements, object-oriented software elements, class elements and task elements), processors, functions, properties, procedures, subroutines, segments of a program code, drivers, firmware, a microcode, a circuit, data, a database, data structures, tables, arrays, and variables.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a light source configured to emit light;
   a display panel comprising a plurality of pixels, each of the plurality of pixels comprising a white sub pixel and a plurality of color sub pixels;
   a controller configured to control a drive voltage applied to the plurality of pixels based on a ratio of an area of the white sub pixel to a sum of areas of the plurality of color sub pixels; and
   a waveguide plate having a pattern that wallows the light emitted from the light source to be output from the waveguide plate with an obtuse angle with respect to an optical axis of the light source.

2. The display apparatus of claim 1, further comprising:
   a polarizing plate having a hole pattern in a region corresponding to the white sub pixel and a polarizing pattern in a region corresponding to the plurality of color sub pixels.

3. The display apparatus of claim 2, wherein
   a ratio of a total area of a region in which the hole pattern is provided in the polarizing plate to a total area of a region in which the white sub pixel is provided in the display panel is predetermined.

4. The display apparatus of claim 1, wherein
   the light emitted from the light source is a blue light.

5. The display apparatus of claim 4, wherein
   the display panel comprises a red color filter into which a first phosphor is injected to convert the blue light emitted from the light source into a red light and scatter the red light, a green color filter into which a second phosphor is injected to convert the blue light emitted from the light source into a green light and scatter the green light, and a blue color filter into which scatter is injected to scatter the blue light emitted from the light source.

6. The display apparatus of claim 1, wherein
the display panel comprises at least one color filter into which one of phosphor and scatter is injected.

7. The display apparatus of claim 1, wherein
the ratio of the area of the white sub pixel to the sum of the areas of the plurality of color sub pixels is 1.

8. The display apparatus of claim 1, wherein
the controller is further configured to set the drive voltage to have a value in inverse proportion to the ratio of the area of the white sub pixel to the sum of the areas of the plurality of color sub pixels.

9. The display apparatus of claim 1, wherein the ratio of the area of the white sub pixel to the sum of the areas of the plurality of color sub pixels is in a range from 0.8 to 1.2.

10. The display apparatus of claim 1,
wherein the controller is further configured to perform a transparent mode by controlling driving of at least one of the light source and the display panel.

11. A display apparatus comprising:
a light source configured to emit light;
a display panel comprising a plurality of pixels, each of the plurality of pixels comprising a white sub pixel configured to transmit the light output from a waveguide plate, and a plurality of color sub pixels;
a waveguide plate having a pattern that allows the light emitted from the light source to be output from the waveguide with an obtuse angle with respect to an optical axis of the light source; and
a controller configured to control at least one of displaying an image and executing a transparent mode by controlling a drive power applied to at least one of the light source and the display panel, and control a drive voltage applied to the plurality of pixels based on a ratio of an area of the white sub pixel to a sum of areas of the plurality of color sub pixels.

12. The display apparatus of claim 11, further comprising:
a polarizing plate having a hole pattern in a region corresponding to the white sub pixel and a polarizing pattern in a region corresponding to the plurality of color sub pixels.

13. The display apparatus of claim 12, wherein
a ratio of a total area of a region in which the hole pattern is provided in the polarizing plate to a total area of a region in which the white sub pixel is provided in the display panel is predetermined.

14. The display apparatus of claim 11, wherein
the display panel comprises at least one color filter into which one of phosphor and scatter is injected.

15. The display apparatus of claim 11, wherein
the light emitted from the light source is a blue light,
wherein the display panel comprises a red color filter into which a first phosphor is injected to convert the blue light emitted from the light source into a red light and scatter the red light, a green color filter into which a second phosphor is injected to convert the blue light emitted from the light source into a green light and scatter the green light, and a blue color filter into which scatter is injected to scatter the blue light emitted from the light source.

16. The display apparatus of claim 11, wherein
the controller is further configured to set the drive voltage to have a value in inverse proportion to the ratio of the area of the white sub pixel to the sum of the areas of the plurality of color sub pixels.

17. The display apparatus of claim 11, wherein the ratio of the area of the white sub pixel to the sum of the areas of the plurality of color sub pixels is 1.

* * * * *